United States Patent
Kodama et al.

(10) Patent No.: US 9,177,405 B2
(45) Date of Patent: Nov. 3, 2015

(54) IMAGE PROCESSING APPARATUS, COMPUTER PROGRAM PRODUCT, AND IMAGE PROCESSING SYSTEM

(71) Applicants: Yu Kodama, Kanagawa (JP); Kenji Namie, Kanagawa (JP); Yuuji Kasuya, Kanagawa (JP)

(72) Inventors: Yu Kodama, Kanagawa (JP); Kenji Namie, Kanagawa (JP); Yuuji Kasuya, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 169 days.

(21) Appl. No.: 13/948,795

(22) Filed: Jul. 23, 2013

(65) Prior Publication Data
US 2014/0035847 A1    Feb. 6, 2014

(30) Foreign Application Priority Data

Aug. 1, 2012  (JP) .................... 2012-171489
Jul. 1, 2013  (JP) .................... 2013-138026

(51) Int. Cl.
G06T 11/60    (2006.01)
H04L 29/06    (2006.01)
G06F 3/0488   (2013.01)

(52) U.S. Cl.
CPC ............ *G06T 11/60* (2013.01); *G06F 3/04883* (2013.01); *H04L 29/06401* (2013.01); *H04L 65/4015* (2013.01)

(58) Field of Classification Search
None
See application file for complete search history.

(56) References Cited

U.S. PATENT DOCUMENTS

| | | | |
|---|---|---|---|
| 8,639,032 B1* | 1/2014 | Voorhees et al. | 382/176 |
| 2003/0069931 A1 | 4/2003 | Omura et al. | |
| 2007/0057923 A1* | 3/2007 | Kitazaki | 345/173 |
| 2010/0149206 A1* | 6/2010 | Shigehisa et al. | 345/595 |
| 2012/0229425 A1* | 9/2012 | Barrus et al. | 345/179 |
| 2012/0254773 A1* | 10/2012 | Viswanathan | 715/753 |
| 2013/0022330 A1* | 1/2013 | Carter et al. | 386/224 |
| 2015/0002435 A1* | 1/2015 | Shimizu et al. | 345/173 |

FOREIGN PATENT DOCUMENTS

JP    2004-94833    3/2004

* cited by examiner

*Primary Examiner* — Joseph Haley
*Assistant Examiner* — Emily Frank
(74) *Attorney, Agent, or Firm* — Oblon, McClelland, Maier & Neustadt, L.L.P.

(57) ABSTRACT

An image processing apparatus includes a selecting unit that selects a plurality of strokes from among strokes drawn in a plurality of display images displayed in a switching manner, in accordance with attributes added to the strokes, and a generating unit that generates an image in which the selected strokes are arranged according to an arrangement rule set in advance.

16 Claims, 9 Drawing Sheets

IMAGE PROCESSING APPARATUS, COMPUTER PROGRAM PRODUCT, AND IMAGE PROCESSING SYSTEM

CROSS-REFERENCE TO RELATED APPLICATIONS

The present application claims priority to and incorporates by reference the entire contents of Japanese Patent Application No. 2012-171489 filed in Japan on Aug. 1, 2012 and Japanese Patent Application No. 2013-138026 filed in Japan on Jul. 1, 2013.

BACKGROUND OF THE INVENTION

1. Field of the Invention

The present invention relates to an image processing apparatus, a computer program product, and an image processing system.

2. Description of the Related Art

A so-called electronic information board has been marketed that is provided with a touch panel mounted on a display unit, such as a flat panel including a liquid crystal television or a plasma display or a large screen of 40 to 60 inches using a projector. The electronic information board is able to display a screen of a personal computer in a greater size when the electronic information board is connected to the personal computer. Therefore, the electronic information board is used for presentations at meetings in companies or administrative organizations, or used in educational institutions. Besides, the electronic information board provides a computer operation function that enables to operate the personal computer by touching the display unit via the mounted touch panel instead of operating a mouse of the personal computer while the screen of the personal computer is being displayed on the display unit.

In addition, application software to be executed on the personal computer connected to the electronic information board has been provided together with the electronic information board. The application software provides a handwriting function, which enables to display a screen serving as a black board on the electronic information board and enables to draw handwritten characters on the screen by using the touch panel, import the screen of the personal computer executing the application software, and draw handwriting (stroke) on the imported screen in a superimposed manner. With use of the handwriting function as described above, it becomes possible to directly write comments or the like onto the display unit while a document for explanation at a meeting or the like is being displayed on the electronic information board, or it becomes possible to store the contents of the screen including the writing in the storage unit if needed. Therefore, it becomes possible to efficiently summarize the conclusion of the meeting by reviewing the contents of the screen displayed on the electronic information board after the end of the meeting or by reusing the contents of the screen stored in the storage unit.

If the handwriting function is used in the meeting, it becomes possible to display and input necessary information by operating the electronic information board without interrupting the meeting. However, in the electronic information board, there is a limitation on the number of display images (for example, documents displayed for explanation at the meeting or screens of the personal computer) that can be displayed on a single screen while maintaining the readability of the images. Therefore, if the number of the display images increases, it becomes difficult to overview the flow of a discussion at the meeting from the display images. Furthermore, if the number of writings in the display images increases, it becomes difficult to distinguish important writings from other writings. Therefore, the important writings written in a plurality of display images are pasted in a summary image to extract the writings from the display images.

There is a need to provide an image processing apparatus, a computer program product, and an image processing system capable of assisting re-arrangement of writings so that a user can efficiently organize a discussion when using the electronic information board.

SUMMARY OF THE INVENTION

It is an object of the present invention to at least partially solve the problems in the conventional technology.

An image processing apparatus includes: a selecting unit that selects a plurality of strokes from among strokes drawn in a plurality of display images displayed in a switching manner, in accordance with attributes added to the strokes; and a generating unit that generates an image in which the selected strokes are arranged according to an arrangement rule set in advance.

A computer program product includes a non-transitory computer-usable medium having computer-readable program codes embodied in the medium. The program codes when executed cause a computer to execute: selecting a plurality of strokes from among strokes drawn in a plurality of display images displayed in a switching manner, in accordance with attributes added to the strokes; and generating an image in which the selected strokes are arranged according to an arrangement rule set in advance.

An image processing system includes: an information processing apparatus that transmits a plurality of display images; a display unit that displays the images transmitted by the information processing apparatus in a switching manner; a detecting unit that detects a contact position or an approach position of an object with respect to the display unit; and an image processing apparatus that draws strokes in the display images based on the contact position or the approach position. The image processing apparatus includes: a selecting unit that selects a plurality of strokes from among the strokes drawn in the display images, in accordance with attributes added to the strokes; and a generating unit that generates an image in which the selected strokes are arranged according to an arrangement rule set in advance.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an image processing apparatus, a computer program product and an image processing system will be explained in detail below with reference to the accompanying drawings.

Figure 1:
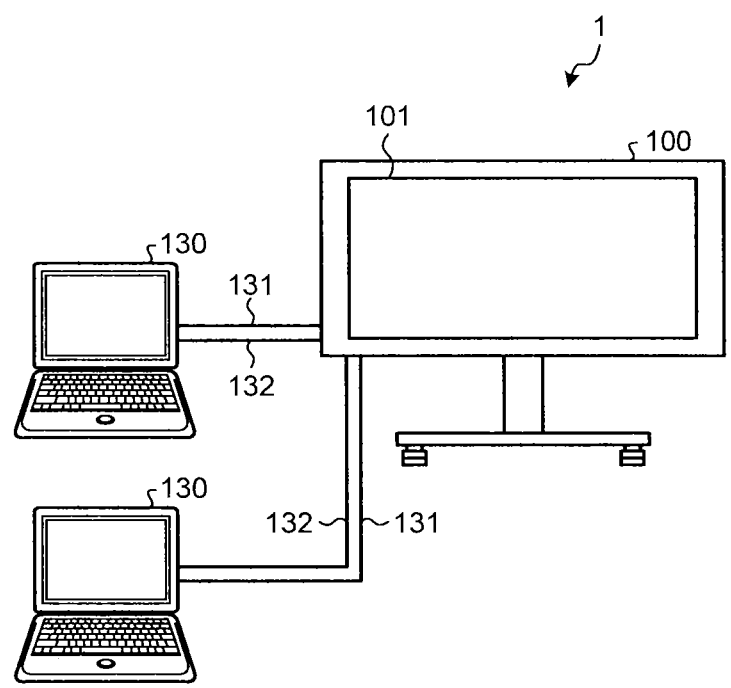
FIG. 1 is a block diagram illustrating a configuration of an image processing system according to an embodiment.

FIG. 1 is a block diagram illustrating a configuration of an image processing system according to an embodiment. An image processing system 1 according to the embodiment includes an image processing apparatus 100 and user personal computers (PCs) 130. The image processing apparatus 100 and the user PCs 130 are connected to one another via cables 131 and 132.

The image processing apparatus 100 is able to display a display image displayed on each of the user PCs 130 onto a display unit 101, and to display a stroke, such as a handwritten character, drawn in the display image according to user operation onto the display unit 101. The stroke is a drawn image generated based on a coordinate position that is detected according to the user operation. The stroke is not limited to the handwritten character, and may include an arbitrary image, such as a graphic form or a line. The stroke may be a stroke group as a gathering of strokes (i.e., a plurality of strokes) each being drawn unicursally, or may be a single stroke drawn unicursally. The image processing apparatus 100 generates an event based on the contact to the display unit 101, and transmits the event, as an event by an input device such as a mouse or a keyboard, to the user PCs 130. The display unit 101 may be a display device, such as a liquid crystal display (LCD), or a projector for projecting a display image onto a screen.

The user PCs 130 are information processing apparatuses that transmit display images to be displayed on the image processing apparatus 100. Each of the user PCs 130 includes an interface (not illustrated) for outputting an image signal, and transmits, to the image processing apparatus 100, an image signal of the display image to be displayed on the image processing apparatus 100 via the interface at a predetermined rate (for example, 30 frames per second).

In the embodiment, each of the user PCs 130 includes a video graphics array (VGA) output terminal (not illustrated) serving as the interface (not illustrated) for outputting the image signal, and transmits a VGA signal (the image signal) to the image processing apparatus 100 via the cable 131, such as a VGA cable. In the embodiment, the user PCs 130 transmit the VGA signals by using the VGA output terminals; however, it is not limited to this example. For example, the image signals may be transmitted to the image processing apparatus 100 by wireless communication compliant with various wireless communication protocols.

The user PCs 130 are also able to acquire a display image displayed on the display unit 101 of the image processing apparatus 100. In the embodiment, each of the user PCs 130 includes a universal serial bus (USB) port (not illustrated), and acquires the display image stored in the image processing apparatus 100 connected via the cable 132, such as a USB cable, by using a general-purpose driver, such as a use mass storage class driver.

In the embodiment, notebook PCs are employed as the user PCs 130. However, information processing apparatuses, such as desktop PCs, tablet PCs, personal digital assistants (PDA), digital video cameras, digital cameras, smartphones, or mobile phones, capable of transmitting the display images may be employed as the user PCs 130. Furthermore, while the image processing system 1 includes the two user PCs 130 in the embodiment, the image processing system 1 may include one user PC 130 or three or more user PCs 130.

Figure 2:
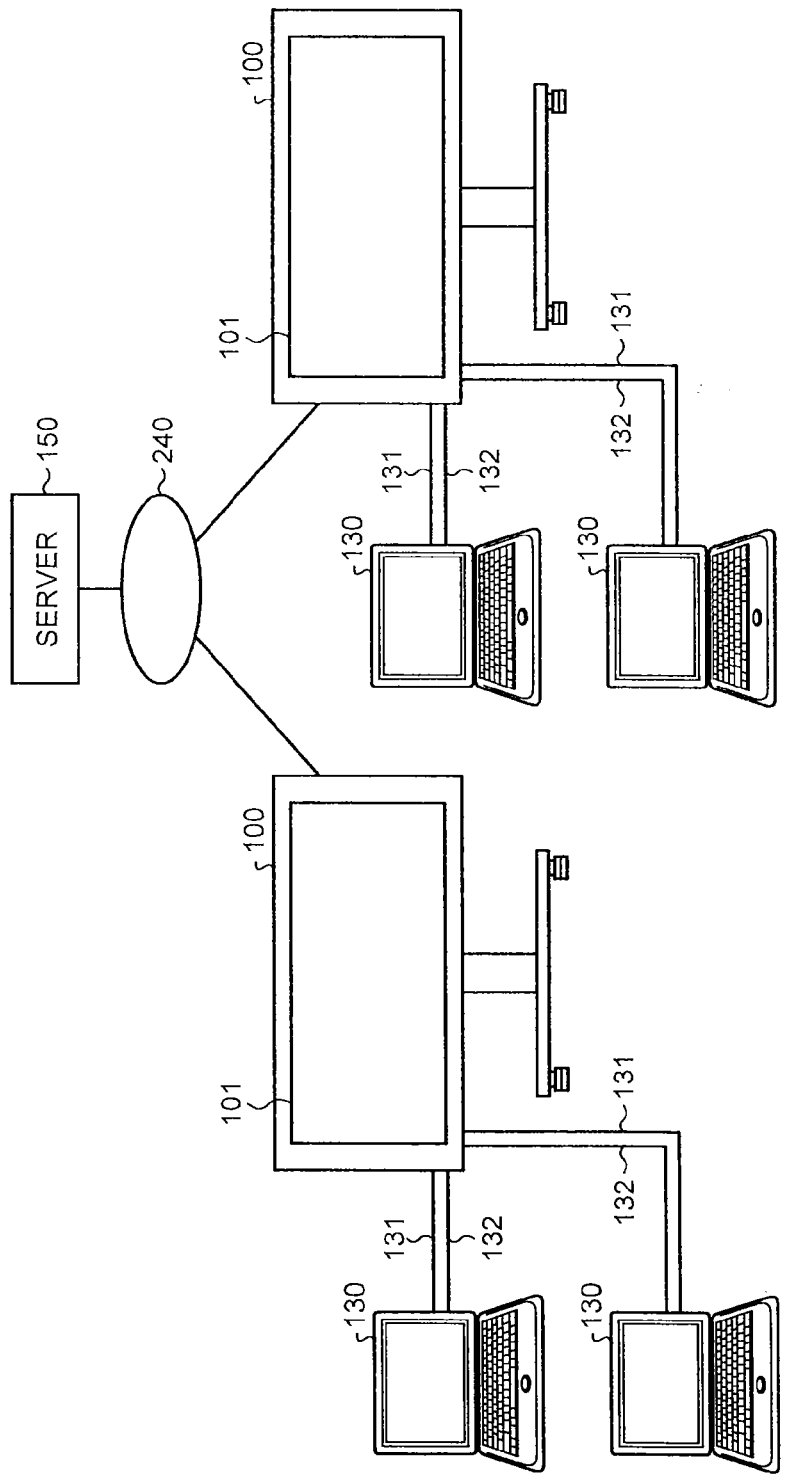
FIG. 2 is a diagram illustrating an example in which the image processing systems according to the embodiment are connected to each other via a server.

FIG. 2 is a diagram illustrating an example in which the image processing systems according to the embodiment are connected to each other via a server. The image processing systems 1 according to the embodiment are connected to a server 150 via a network 240, such as the Internet, and share display images that can be displayed on the image processing apparatuses 100 (or the user PCs 130) via the server 150.

Figure 3:
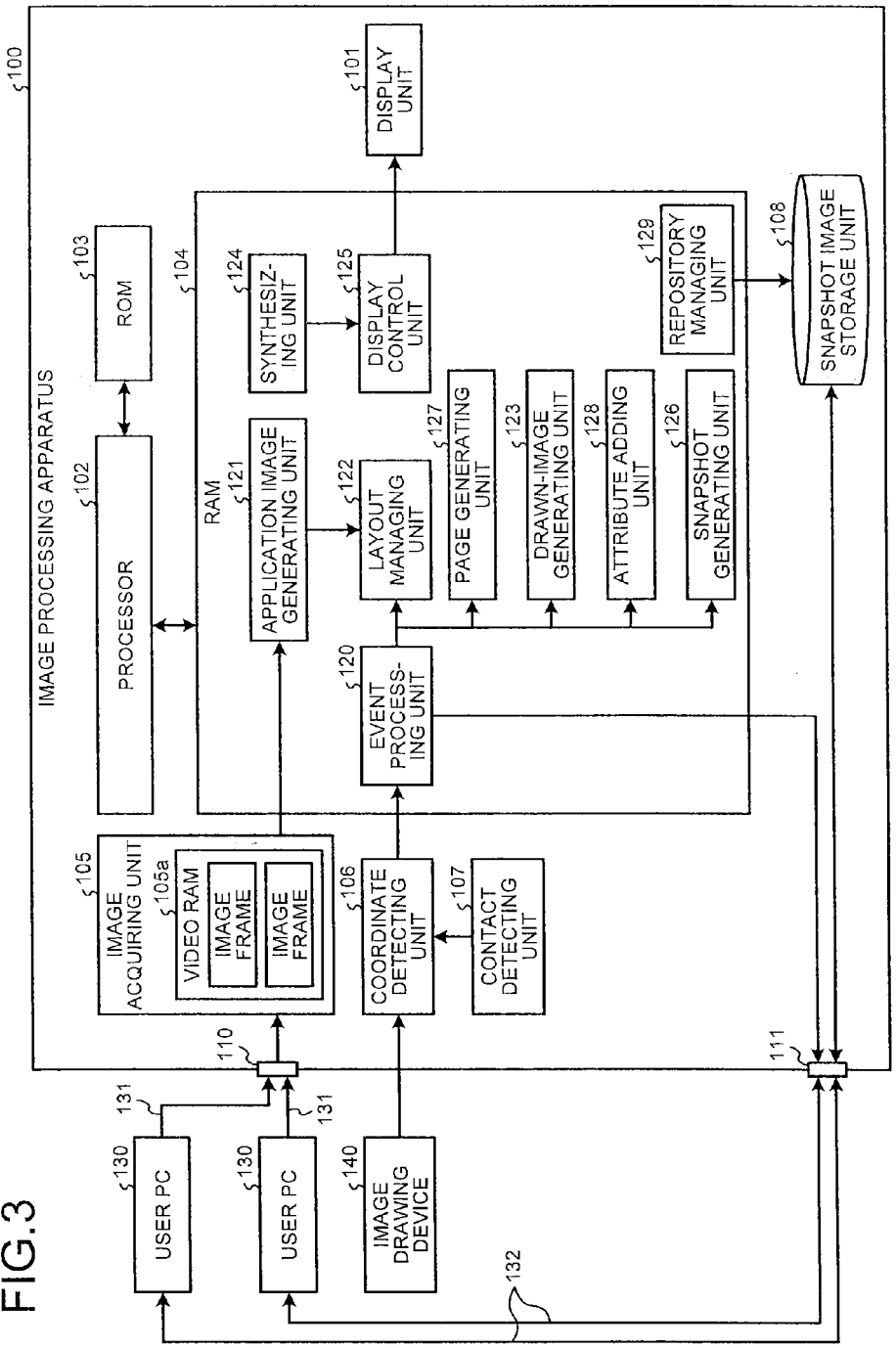
FIG. 3 is a block diagram illustrating a hardware configuration and a functional configuration of an image processing apparatus according to the embodiment.

FIG. 3 is a block diagram illustrating a hardware configuration and a functional configuration of the image processing apparatus according to the embodiment. The image processing apparatus 100 according to the embodiment includes an image input interface 110 and an image input interface 111, and is connected to the user PCs 130 via these interfaces.

The image input interface 110 includes a digital visual interface (DVI) connector with a DVI terminal, and receives image signals of display images transmitted by the user PCs 130. The image input interface 110 receives VGA signals from the user PCs 130 via the cables 131, such as VGA cables, and supplies the VGA signals (the image signals) to an image acquiring unit 105.

The image input interface 110 may include a VGA connector, a high definition multimedia interface (HDMI) (registered trademark) connector, or a DisplayPort connector. Furthermore, the image input interface 110 may receive the image signals from the user PCs 130 by wireless communication compliant with a wireless communication protocol, such as Bluetooth (registered trademark) or WiFi.

The image input interface 111 is a physical interface that includes a USB socket or the like, and outputs a display image displayed on the display unit 101 of the image processing apparatus 100 to an external apparatus, such as the user PCs 130.

The image processing apparatus 100 according to the embodiment also includes the display unit 101, a processor 102, a read only memory (ROM) 103, a random access memory (RAM) 104, the image acquiring unit 105, a coordinate detecting unit 106, a contact detecting unit 107, and a snapshot image storage unit 108.

The processor 102 includes a central processing unit (CPU) or a micro processing unit (MPU), runs the operating system (OS), such as Windows (registered trademark) series, UNIX (registered trademark), LINUX (registered trademark), TRON, ITRON, µITRON, Chrome, or Android, and executes programs written in a program language, such as assembler, C, C++, Java (registered trademark), JavaScript (registered trademark), PERL, RUBY, or PYTHON, under the control of the OS. The ROM 103 is a nonvolatile memory for storing a boot program, such as BIOS or EFI.

The RAM 104 includes a dynamic random access memory (DRAM) or a static random access memory (SRAM), and serves as a run space (storage area) for executing a program by the processor 102. The processor 102 reads a program from a storage device (not illustrated) such as a hard disk drive (HDD) that stores therein software programs or various types of data in a nonvolatile manner, and loads the program onto the RAM 104 to execute the program. The program executed by the processor 102 includes an event processing unit 120, an application image generating unit 121, a layout managing unit 122, a drawn-image generating unit 123, a synthesizing unit 124, a display control unit 125, a snapshot generating unit 126, a page generating unit 127, an attribute adding unit 128, and a repository managing unit 129. By causing the processor 102 to read the program from the storage device (not illustrated) and execute the program, the above units are loaded onto the RAM 104 so that the event processing unit 120, the application image generating unit 121, the layout managing unit 122, the drawn-image generating unit 123, the synthesizing unit 124, the display control unit 125, the snapshot generating unit 126, the page generating unit 127, the attribute adding unit 128, and the repository managing unit 129 are generated on the RAM 104.

Meanwhile, the program executed by the image processing apparatus 100 of the embodiment may be provided by being stored in a ROM or the like in advance. Furthermore, the program executed by the image processing apparatus 100 of the embodiment may be provided by being recorded in a computer-readable recording medium, such as a compact disc-ROM (CD-ROM), a flexible disk (FD), a compact disc-recordable (CD-R), or a digital versatile disk (DVD), in a computer-installable or computer-executable file format.

Moreover, the program executed by the image processing apparatus 100 of the embodiment may be stored in a computer connected to a network, such as the Internet, and may be provided by downloading via the network. Furthermore, the program executed by the image processing apparatus 100 of the embodiment may be provided or distributed via a network, such as the Internet.

The image acquiring unit 105 acquires the image signals transmitted by the user PCs 130 via the image input interface 110. When receiving the image signals via the image input interface 110, the image acquiring unit 105 analyzes the received image signals, acquires image information, such as the resolution or the frequency of update, on image frames serving as display images that are formed based on the image signals, and sends the image information to the application image generating unit 121. The image acquiring unit 105 forms the image frames serving as the display images based on the received image signals, and stores, by overwriting, the image frames in a video RAM 105a that can temporarily store therein the image frames.

The application image generating unit 121 generates various display windows to be displayed on the display unit 101. In the embodiment, the application image generating unit 121 generates a display window for displaying the image frames serving as the display images transmitted by the user PCs 130, a display window for displaying an image in which strokes drawn in a plurality of the display images by user operation are arranged (hereinafter, the image will be referred to as a stroke gathering page), a display window for displaying buttons or menus for performing various settings on the image processing apparatus 100, a display window for displaying a file viewer or a web browser, or the like. The application image generating unit 121 draws the generated display window on an image layer in which the display window is to be drawn.

The layout managing unit 122 draws the display images transmitted by the user PCs 130 onto the display window generated by the application image generating unit 121. When receiving the image information from the image acquiring unit 105, the layout managing unit 122 acquires the image frames stored in the video RAM 105a, changes the acquired image frames so that the image frames can fit inside the display window by using the received image information, and draws the image frames on the display window.

The contact detecting unit 107 detects contact or approach of an object, such as an image drawing device 140, to the display unit 101. In the embodiment, an infrared blocking coordinate input/detecting device is employed as the contact detecting unit 107. The coordinate input/detecting device is configured such that two light receiving/emitting devices arranged at both ends of the lower side of the display unit 101 emit a plurality of infrared beams parallel to the display screen of the display unit 101 and receive infrared beams reflected from a reflecting member arranged on the periphery of the display unit 101. The contact detecting unit 107 notifies the coordinate detecting unit 106 of pieces of identification information on the infrared beams that are emitted by the two light receiving/emitting devices and that are blocked by the object. The coordinate detecting unit 106 detects a coordinate position as a contact position or an approached position of the object.

As the contact detecting unit 107, various detection mechanisms may be employed, such as a capacitance touch panel that detects the contact position or the approach position by detecting a change in the capacitance, a resistive touch panel that detects the contact position or the approach position by detecting a change in the voltage on two opposing resistive films, or an electromagnetic induction touch panel that detects the contact position or the approach position by detecting electromagnetic induction that occurs when a contact object comes in contact with or approaches the display screen of the display unit 101.

The coordinate detecting unit 106 detects the coordinate position as a position at which the object comes in contact with or approaches the display screen of the display unit 101, and issues various events. In the embodiment, the coordinate detecting unit 106 detects the coordinate position of the contact position or the approach position of the object based on the identification information on the blocked infrared beams notified by the contact detecting unit 107. The coordinate detecting unit 106 sends the coordinate position of the contact position or the approach position and the various events to the event processing unit 120.

The events issued by the coordinate detecting unit 106 include an event for notifying the contact or approach of the object (TOUCH), an event for notifying that a contact point or an approach point moves in the state in which the object is kept in contact with or close to the display screen of the display unit 101 (MOVE), and an event for notifying that the object is separated from the display screen of the display unit 101 (RELEASE). These events include the coordinate position of the contact position or the approach position.

The image drawing device 140 is a device for drawing a stroke by being brought into contact with or caused to approach the display screen of the display unit 101. In the embodiment, the image drawing device 140 is in the form of a pen, on the tip of which a detecting unit for detecting a contact of an object is mounted. When the detecting unit comes in contact with an object, the image drawing device 140 transmits a contact signal indicating the contact and the identification information on the image drawing device 140 to the coordinate detecting unit 106.

The image drawing device 140 includes, on a side surface or a rear end portion, a mode selector switch for switching between an image processing apparatus operating mode and a user PC operating mode. In the image processing apparatus operating mode, a user is allowed to draw a stroke, such as an arbitrary graphic form or a character, in a display image displayed on the display unit 101 and to select an object, such as a menu or a button, displayed on the display unit 101. In the user PC operating mode, a user is allowed to select an object, such as a menu or a button, displayed on the display unit 101.

In the embodiment, if a user brings the image drawing device 140 into contact with the display screen of the display unit 101 while pressing the mode selector switch, the image drawing device 140 transmits a mode type signal indicating the user PC operating mode, together with the contact signal and the identification information on the image drawing device 140. If the user brings the image drawing device 140 into contact with the display screen of the display unit 101 without pressing the mode selector switch, the image drawing device 140 transmits a mode type signal indicating the image processing apparatus operating mode, together with the contact signal and the identification information on the image drawing device 140.

When receiving the pieces of identification information on the infrared beams from the contact detecting unit 107, the coordinate detecting unit 106 detects the coordinate position of the contact position of the object. Subsequently, when receiving the contact signal from the image drawing device 140, the coordinate detecting unit 106 issues various events. In this case, the coordinate detecting unit 106 notifies the event processing unit 120 of the information indicating a mode designated by the mode type signal received from the image drawing device 140 (hereinafter, the information is referred to as mode type information) and the events.

In the embodiment, the image drawing device 140 transmits various signals to the coordinate detecting unit 106 by near field communication, such as Bluetooth (registered trademark). However, the image drawing device 140 may transmit the various signals to the coordinate detecting unit 106 by wireless communication using ultrasound or infrared.

The event processing unit 120 processes the events issued by the coordinate detecting unit 106. When the mode indicated by the mode type information is the user PC operating mode, and if the event processing unit 120 receives an event from the coordinate detecting unit 106, the event processing unit 120 transmits a mouse event to the user PCs 130. When the mode indicated by the mode type information is the image processing apparatus operating mode, and if the event processing unit 120 receives an event from the coordinate detecting unit 106, the event processing unit 120 notifies other functional units in the image processing apparatus 100 of a drawing instruction event and a selection notification event.

Here, the mouse event is the same as an event issued by the input device, such as a mouse, of each of the user PCs 130, and is issued to the user PCs 130 upon contact of the image drawing device 140 when the mode is switched to the user PC operating mode. The event processing unit 120 converts the coordinate position contained in the event issued by the coordinate detecting unit 106 into a coordinate position according to the screen size of the user PCs 130, and transmits the converted coordinate position and the mouse event to the user PCs 130. The user PCs 130 process the mouse event in the same manner as the event issued by the input device, such as a mouse.

The drawing instruction event is an event for instructing the image processing apparatus 100 to draw an image. The drawing instruction event is issued upon contact or approach of the image drawing device 140 to the display screen of the display unit 101 when the mode is switched to the image processing apparatus operating mode.

The selection notification event indicates that an object is selected from among various objects, such as buttons or menu bars, displayed on the display screen of the display unit 101. The selection notification event is issued upon contact or approach of the image drawing device 140 to the display screen of the display unit 101 when the mode is switched to the image processing apparatus operating mode. The event processing unit 120 issues the selection notification event when the coordinate position contained in the event issued by the coordinate detecting unit 106 is within a coordinate region of the object.

In the embodiment, identification information is assigned to each of the drawing instruction event and the selection notification event, and the units of the image processing apparatus 100 that operate by using each of the events as a trigger perform various types of processing by referring to the corresponding identification information. Furthermore, identification information on the selected object is added to the selection notification event, and the units of the image processing apparatus 100 that operate by using the selection notification event as a trigger perform various types of processing by referring to the identification information on the object.

The drawn-image generating unit 123 generates a stroke drawn in the display image displayed on the display unit 101, based on the contact position or the approach position detected by the coordinate detecting unit 106. In the embodiment, when receiving the drawing instruction event, the drawn-image generating unit 123 generates, as a stroke, an image layer in which a color at the coordinate position of the contact position or the approach position detected by the coordinate detecting unit 106 is converted to a specific color. The drawn-image generating unit 123 stores the generated image layer, as a drawn image, in a storage area of the RAM 104.

The synthesizing unit 124 synthesizes various images. The synthesizing unit 124 generates a synthesized image by synthesizing an image layer of a display window generated by the application image generating unit 121 (hereinafter, referred to as an application image layer), an image layer of a display image drawn by the layout managing unit 122 (hereinafter, referred to as an image capture layer), and an image layer of a drawn image generated by the drawn-image generating unit 123 (hereinafter, referred to as a handwritten layer).

The display control unit 125 controls the display unit 101 to display a plurality of display images transmitted by the user PCs 130 in a switching manner. When the drawn-image generating unit 123 generates a drawn image, the display control unit 125 displays the synthesized image generated by the synthesizing unit 124 on the display unit 101. In the embodiment, the synthesizing unit 124 calls the display control unit 125 to display the synthesized image on the display unit 101. Incidentally, the synthesizing unit 124 and the display control unit 125 may generate and display the synthesized image on the display unit 101 at the same frequency as the frequency of update contained in the image information acquired from the image acquiring unit 105.

The snapshot generating unit 126 generates a snapshot image, in which the display image transmitted by the user PCs 130 and the drawn image generated by the drawn-image generating unit 123 are synthesized. When receiving the selection notification event indicating that a snapshot button displayed on the display unit 101 is selected to generate a snapshot image, the snapshot generating unit 126 generates a snapshot image by synthesizing the image capture layer and the handwritten layer. After generating the snapshot image, the snapshot generating unit 126 causes the repository managing unit 129 to store the snapshot image in the snapshot image storage unit 108.

The repository managing unit 129 controls the snapshot image storage unit 108 that stores therein the snapshot image. As described above, the repository managing unit 129 stores the snapshot image generated by the snapshot generating unit 126 in the snapshot image storage unit 108. The repository managing unit 129 acquires the snapshot image from the snapshot image storage unit 108 and transmits the snapshot image to the user PCs 130, according to instructions from the user PCs 130.

When the attribute adding unit 128 receives the selection notification event indicating that an attribute add button is selected to add an attribute to the stroke drawn in the display image displayed on the display unit 101, the attribute adding unit 128 adds the attribute to the stroke drawn in the display image displayed on the display unit 101.

When the page generating unit 127 receives the selection notification event indicating that a page generation button is selected to generate a stroke gathering page, in which a plurality of strokes drawn in a plurality of display images displayed on the display unit 101 are arranged, the page generating unit 127 functions as a selecting unit that selects a plurality of strokes (hereinafter, referred to as important strokes) from among the strokes drawn in the display images that are displayed on the display unit 101 in a switching manner, in accordance with the attributes added to the strokes. The page generating unit 127 also functions as a generating unit that generates the stroke gathering page such that the important strokes are arranged according to an arrangement rule that is set in advance.

When the page generating unit 127 generates the stroke gathering page, the synthesizing unit 124 generates a synthesized image by synthesizing the application image layer generated by the application image generating unit 121 and a layer of the stroke gathering page generated by the page generating unit 127. The display control unit 125 causes the display unit 101 to display the synthesized image, in which the application image layer and the layer of the stroke gathering page are synthesized, on the display unit 101.

Figure 4:
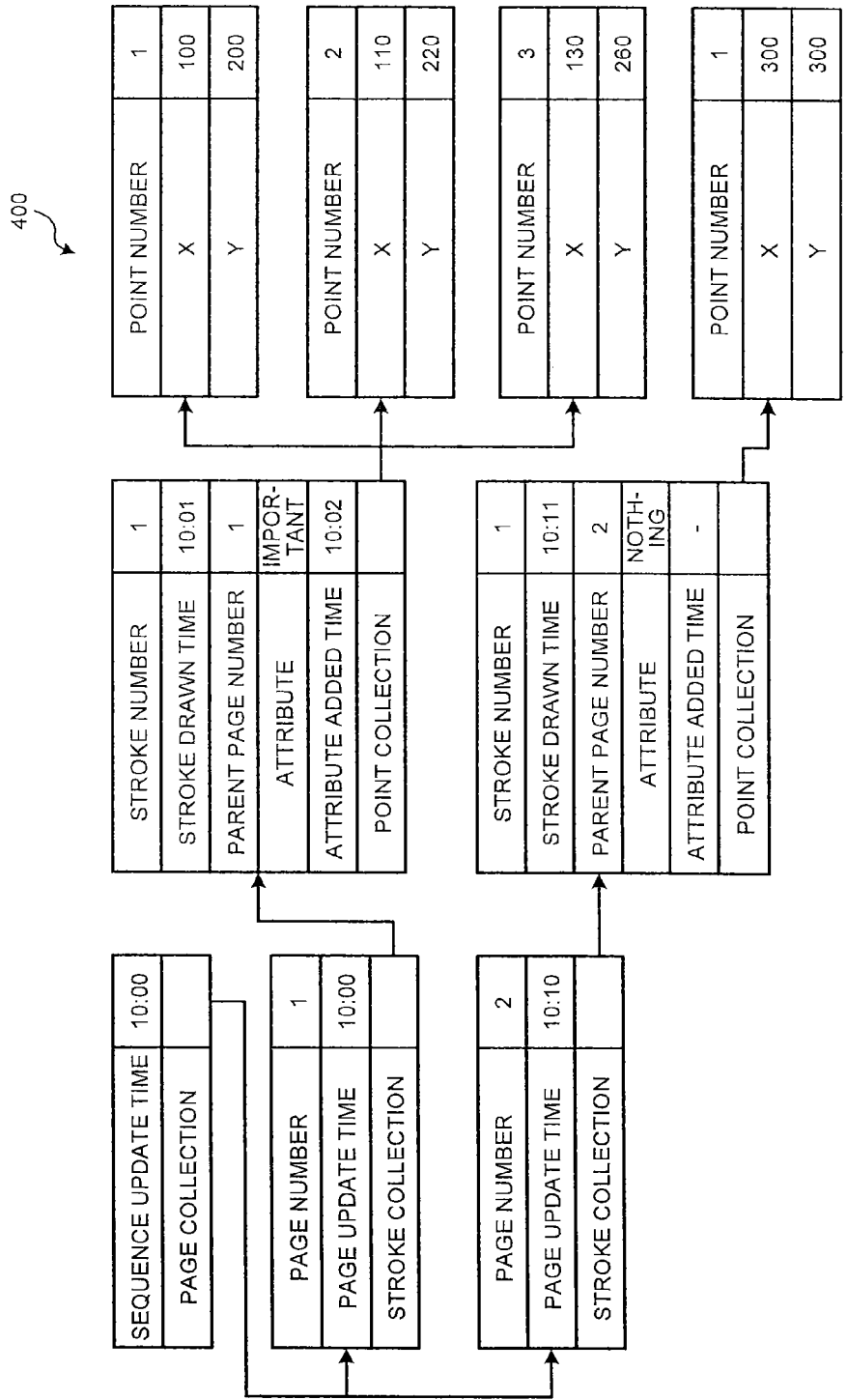
FIG. 4 is a diagram illustrating a structure of a database for storing strokes drawn in display images in the image processing apparatus according to the embodiment.
Figure 5:
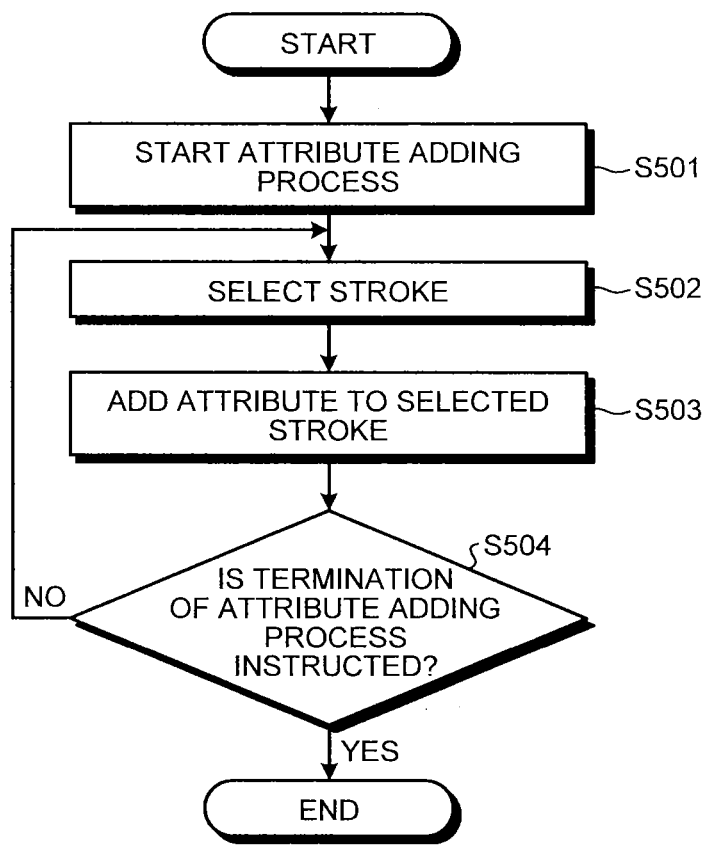
FIG. 5 is a flowchart illustrating the flow of a process for adding an attribute to a stroke drawn in a display image by the image processing apparatus according to the embodiment.

With reference to FIGS. 4 and 5, a process for adding an attribute to a stroke drawn in a display image displayed on the display unit 101 will be explained below. FIG. 4 is a diagram illustrating a structure of a database for storing strokes drawn in the display images in the image processing apparatus according to the embodiment. FIG. 5 is a flowchart illustrating the flow of a process for adding an attribute to a stroke drawn in a display image by the image processing apparatus according to the embodiment.

First, the structure of a stroke database for storing the strokes will be explained below with reference to FIG. 4, and thereafter, the process for adding an attribute to a stroke drawn in a display image displayed on the display unit 101 will be explained. In a stroke database 400, a sequence update time and a page collection are stored in an associated manner. The sequence update time indicates a time at which display of the display images is started according to a sequence. The sequence means the order of display of the display images (pages) that are displayed on the display unit 101 in a switching manner at one meeting or the like. The display images are units of the sequence.

The page collection is information indicating a gathering of the display images displayed according to the sequence. In the embodiment, the page collection contains a page number, page update time, and a stroke collection. The page number is information for identifying each of the display images displayed according to the sequence. The page update time indicates a time at which each of the display images is displayed.

The stroke collection is a gathering of strokes drawn in a display image displayed on the display unit 101. In the embodiment, the stroke collection contains a stroke number, a stroke drawn time, a parent page number, an attribute, an attribute added time, and a point collection. The stroke number is information for identifying a stroke drawn in the display image. The stroke drawn time indicates a time at which the stroke is drawn in the display image. The parent page number is information for identifying the display image in which the stroke is drawn. The attribute is an attribute, such as important (the degree of importance of the stroke), a conclusion, or to-do, added to the stroke. The attribute added time indicates a time at which the attribute is added to the stroke. Namely, the stroke database 400 functions as a storage unit for storing the attribute added to each of the strokes and the date and time at which the attribute is added to each of the strokes. The stroke database 400 also functions as a second storage unit for storing the important strokes arranged in the stroke gathering page and pieces of identification information on the display images in which the important strokes are drawn, in an associated manner.

The point collection indicates a coordinate position of a point contained in the stroke in the display image. In the embodiment, the point collection contains a point number and a coordinate position (X, Y). The point number is information for identifying a point contained in the stroke in the display image. The coordinate position (X, Y) is the coordinate of the point contained in the stroke when the upper left corner of the display image serves as an origin.

The flow of a process for generating the stroke database 400 will briefly be explained below. When receiving the selection notification event indicating that the page generation button that is displayed on the display unit 101 and is to instruct the generation of a new display image is selected, the layout managing unit 122 draws the display images transmitted by the user PCs 130 on the display window generated by the application image generating unit 121. When receiving the selection notification event indicating that a page switch button that is displayed on the display unit 101 and is to instruct the switching of the display image is selected, the display control unit 125 switches the display image displayed on the display unit 101. The page number and the page update time of the display image displayed on the display unit 101 are stored in the page collection in the stroke database 400. If a stroke is drawn by the image drawing device 140 while the display image is being displayed on the display unit 101, the drawn-image generating unit 123 generates the stroke from pen-down to pen-up of the image drawing device 140. The stroke number, the stroke drawn time, the parent page number, and the point collection of the generated stroke are stored in the stroke collection contained in the page collection associated with the page number of the display image being displayed.

The process for adding an attribute to a stroke drawn in a display image displayed on the display unit 101 will be explained below with reference to FIG. 5. When receiving the selection notification event indicating that the attribute add button is selected, the attribute adding unit 128 starts an attribute adding process for adding attributes to strokes drawn in a plurality of display images that are displayed on the display unit 101 in a switching manner (Step S501).

When receiving the selection notification event indicating that a user has selected a stroke by bringing a pen or the like into contact with or causing it to approach the stroke drawn in the display image displayed on the display unit 101, the attribute adding unit 128 selects the stroke at the coordinate position contained in the received selection notification event, as a stroke to which an attribute is to be added (Step S502).

Subsequently, the attribute adding unit 128 adds "important", as the attribute, to the selected stroke (Step S503). Furthermore, the attribute adding unit 128 stores "important" as the attribute in the stroke collection of the selected stroke and also stores a current time as the attribute added time in the stroke collection in the stroke database 400. In the embodiment, the attribute adding unit 128 adds one type of attribute to the stroke. However, it may be possible to add a plurality of types of attributes (for example, important (the degree of importance), a conclusion, to-do, and the like) to the stroke.

When receiving the selection notification event indicating that the attribute add button is selected again, the attribute adding unit 128 determines that termination of the attribute adding process is instructed (YES at Step S504). When the attribute adding unit 128 does not receive the selection notification event indicating that the attribute add button is selected again, the attribute adding unit 128 determines that termination of the attribute adding process is not instructed (NO at Step S504), and repeats the processes at Step S502 and Step S503.

Figure 6:
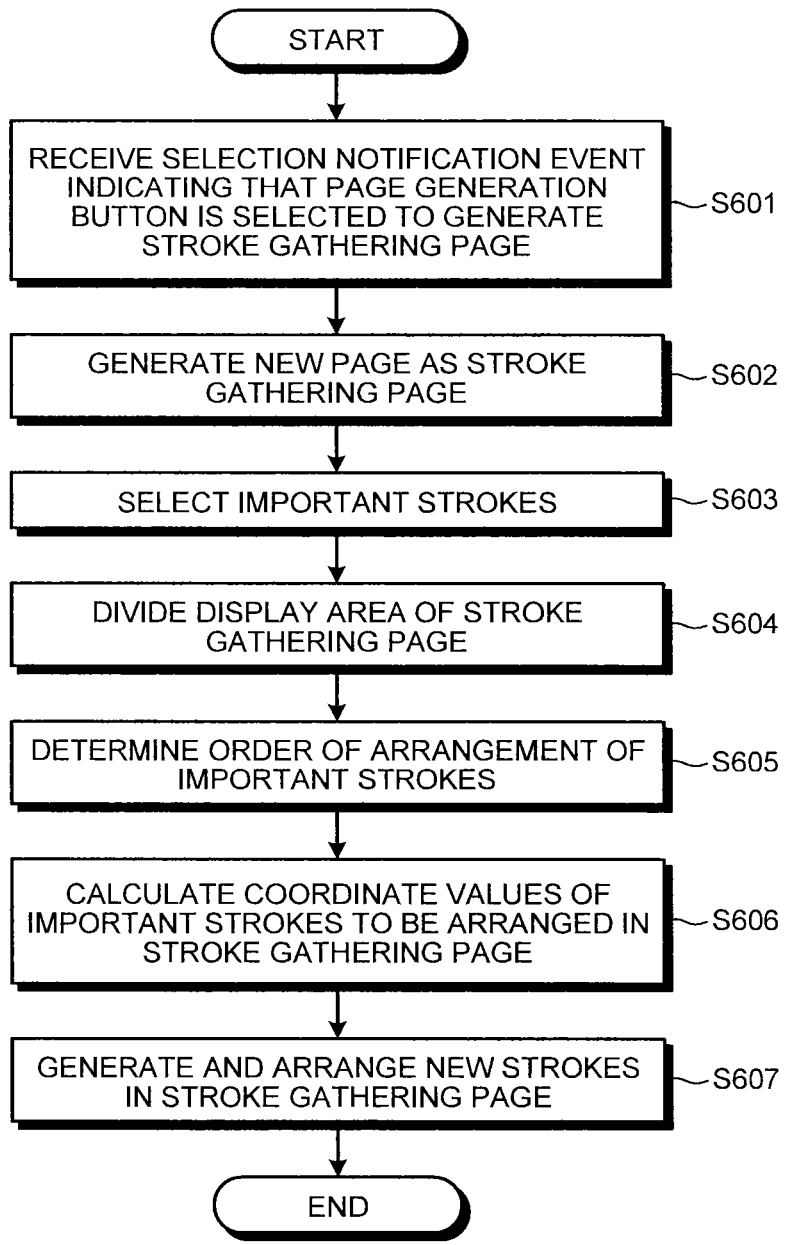
FIG. 6 is a flowchart illustrating the flow of a process for generating a stroke gathering page by the image processing apparatus according to the embodiment.

Next, a process for generating the stroke gathering page will be explained below with reference to FIGS. 6 to 9. FIG. 6 is a flowchart illustrating the flow of a process for generating the stroke gathering page by the image processing apparatus according to the embodiment.

When the page generating unit 127 receives, from the event processing unit 120, the selection notification event indicating that the page generation button to instruct generation of a stroke gathering page is selected (Step S601), the page generating unit 127 generates a new page as a stroke gathering page (Step S602). The new page is a stroke gathering page in the state in which none of the strokes drawn in a collection of the display images indicated by the page collection stored in the stroke database 400 is arranged.

Subsequently, the page generating unit 127 selects a plurality of important strokes from among the strokes drawn in the display images indicated by the page collection stored in the stroke database 400, according to the attributes added to the strokes (Step S603). The page generating unit 127 selects a plurality of important strokes with high importance from among the strokes drawn in the gathering of the display images indicated by the page collection stored in the stroke database 400.

Specifically, the page generating unit 127 selects, as the important strokes, strokes to which "important" is added as the attributes in the stroke collections stored in the stroke database 400, from among the strokes drawn in the gathering of the display images indicated by the page collection stored in the stroke database 400.

Subsequently, the page generating unit 127 divides a display area (in the embodiment, the display window generated by the application image generating unit 121) for displaying the generated new page (the stroke gathering page) into a plurality of divided areas (Step S604). In the embodiment, the page generating unit 127 divides the display window for displaying the new page into the same number of the divided areas as the important strokes.

Furthermore, the page generating unit 127 calculates a reduction ratio of each of the important strokes so that the important strokes can fit inside the respective divided areas. In the embodiment, the page generating unit 127 calculates the reduction ratio of each of the important stokes so that the important strokes can fit inside the respective divided areas for each of the display images in which the important strokes are drawn.

If the number of the display images in which the important strokes are drawn is greater than a predetermined number (in the embodiment, the predetermined number is set to six), the page generating unit 127 divides the display window generated by the application image generating unit 121 into the predetermined number of the divided areas, and calculates the reduction ratio of each of the important strokes so that the important strokes can fit inside the divided areas for each of the display images in which the important strokes are drawn. In this case, the predetermined number is determined in accordance with the size of the display window generated by the application image generating unit 121.

When the number of the display images in which the important strokes are drawn is greater than the predetermined number, and if the display window is divided by the same number as the display images in which the important strokes are drawn, the divided areas is reduced in size and the important strokes arranged in the divided areas may become difficult to see. Therefore, in the embodiment, when the number of the display images in which the important strokes are drawn is greater than the predetermined number, the display window is divided into the predetermined number of the divided areas in order to improve the viewability of the important strokes arranged in the stroke gathering page. Specifically, when the number of the display images in which the important strokes are drawn is greater than the predetermined number, the page generating unit 127 generates a plurality of the stroke gathering pages, in each of which the important strokes are reduced so that the important strokes can fit inside the divided areas for each of the display images in which the important strokes are arranged. More specifically, in the embodiment, when the number of the display images in which the important strokes are drawn is greater than the predetermined number, the page generating unit 127 generates as many stroke gathering pages as the number obtained by dividing the number of the display images in which the important strokes are drawn, by the predetermined number (round up to the nearest whole number).

Subsequently, the page generating unit 127 determines the order of arrangement of the important strokes in the stroke gathering page in accordance with the arrangement rule set in advance (Step S605). The arrangement rule set in advance indicates that, for example, the important strokes are arranged according to at least one of the stroke drawn time (date and time of drawing) of each of the important strokes contained in the stroke collections in the stroke database 400, the attribute added time (date and time of addition) at which a corresponding one of the attributes are added to each of the important strokes, and the parent page number (the order of display) of a corresponding one of the display image in which each of the important strokes is drawn. In the embodiment, the page generating unit 127 determines that each of the important strokes is arranged in the j-th divided area (j=the order of arrangement−the predetermined number×(i×1)) in the i-th stroke gathering page (1+the predetermined number×(i−1) ≤the order of arrangement≤the predetermined number×i).

In addition, in the embodiment, the page generating unit 127 calculates the amount of movement of each of the important strokes from the coordinate position (coordinate value) of the important stroke in the x-y direction in the display window of the display image to a coordinate position (coordinate value) of the important stroke in the x-y direction in the display window of a new page, such that each of the important strokes reduced at the calculated reduction ratio can be arranged in each of the divided areas in the determined order of arrangement for each of the display images in which the important strokes are drawn.

Subsequently, the page generating unit 127 calculates the coordinate values of the important strokes to be arranged in the determined order of arrangement in the display window of the new page (Step S606). In the embodiment, the page generating unit 127 reduces each of the important strokes in the x-y direction in the display window of the display image based on the calculated reduction ratio, and calculates the coordinate value of each of the reduced important strokes in the x-y direction when moving the important stroke by the calculated amount of movement in the display window of the new page.

The page generating unit 127 anew generates the important strokes with the calculated coordinate values in the display window of the new page, and arranges the important strokes in the display window of the new page (Step S607). Therefore, the page generating unit 127 generates a stroke gathering page in which the important strokes are arranged according to the arrangement rule set in advance. In the embodiment, unlike when thumbnails of the display images are displayed or when a preview of aggregated display images is displayed, the page generating unit 127 arranges the important strokes themselves with reduced scale in the stroke gathering page. Therefore, it becomes possible to edit the important strokes arranged in the stroke gathering page as the strokes drawn in the display images. Furthermore, if the page generating unit 127 generates a stroke gathering page by arranging the important strokes according to the arrangement rule for arranging the strokes in order of the stroke drawn time, it becomes possible to obtain the stroke gathering page in which the important strokes are arranged along the flow of a discussion, enabling to take advantage of the flow of the discussion. Moreover, even when the number of the important strokes to be arranged in the stroke gathering page increases, it is not necessary for a user to shape the strokes so that the important strokes can fit inside the stroke gathering page. Therefore, it becomes possible to assist shaping of the important strokes.

Figure 7:
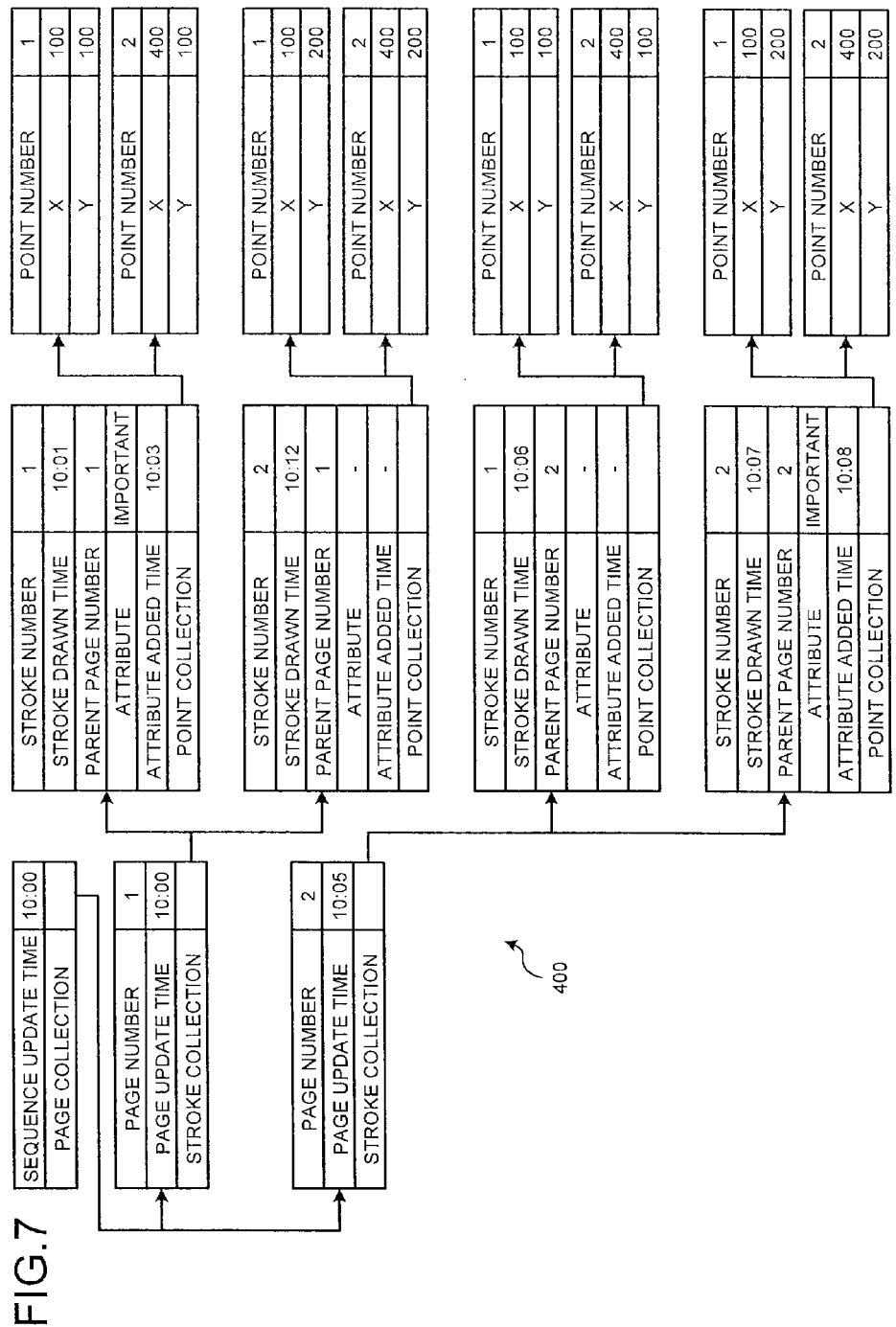
FIG. 7 is a diagram illustrating a structure of a stroke database before the stroke gathering page is generated by the image processing apparatus according to the embodiment.
Figure 8:
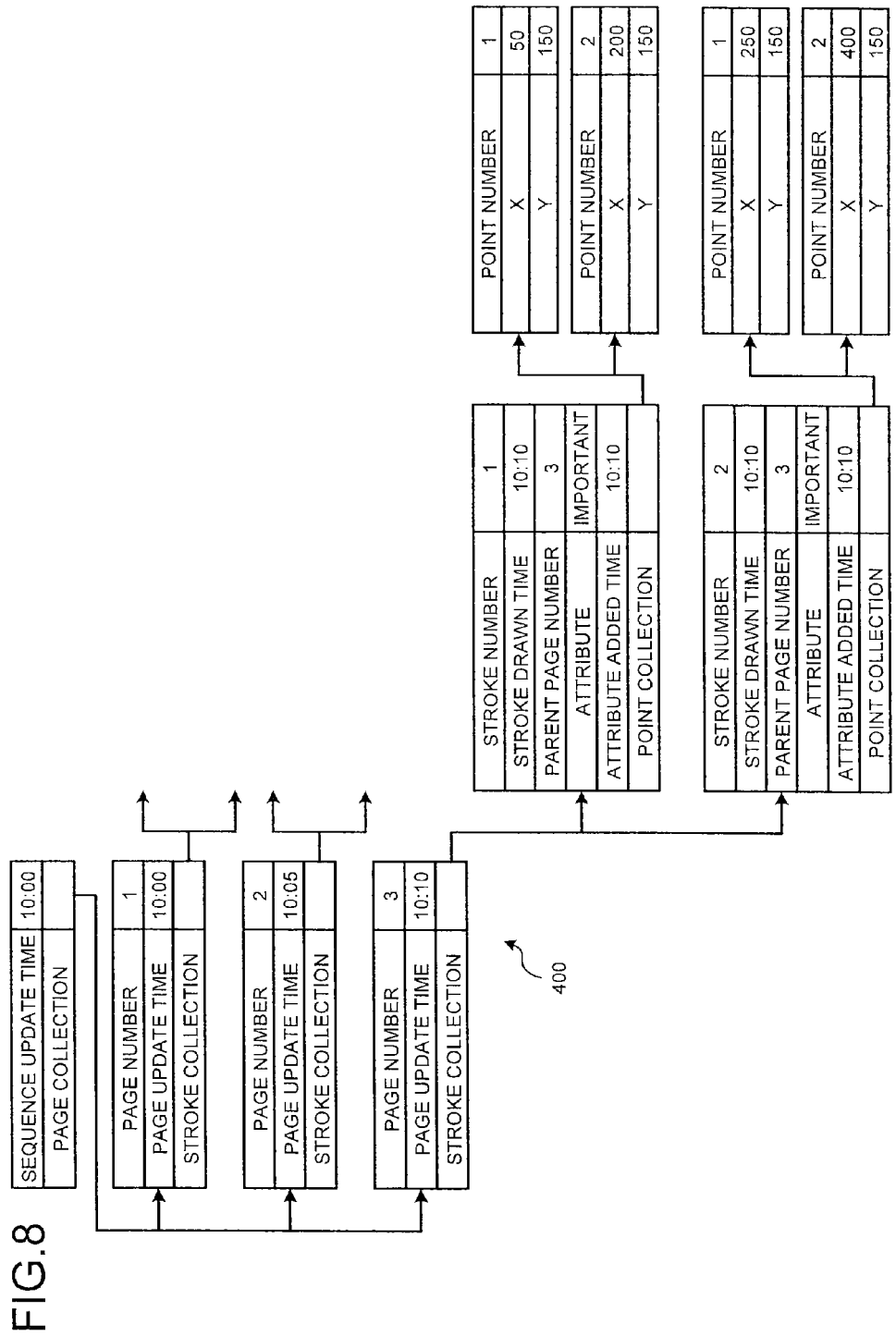
FIG. 8 is a diagram illustrating a structure of the stroke database after the stroke gathering page is generated by the image processing apparatus according to the embodiment.
Figure 9:
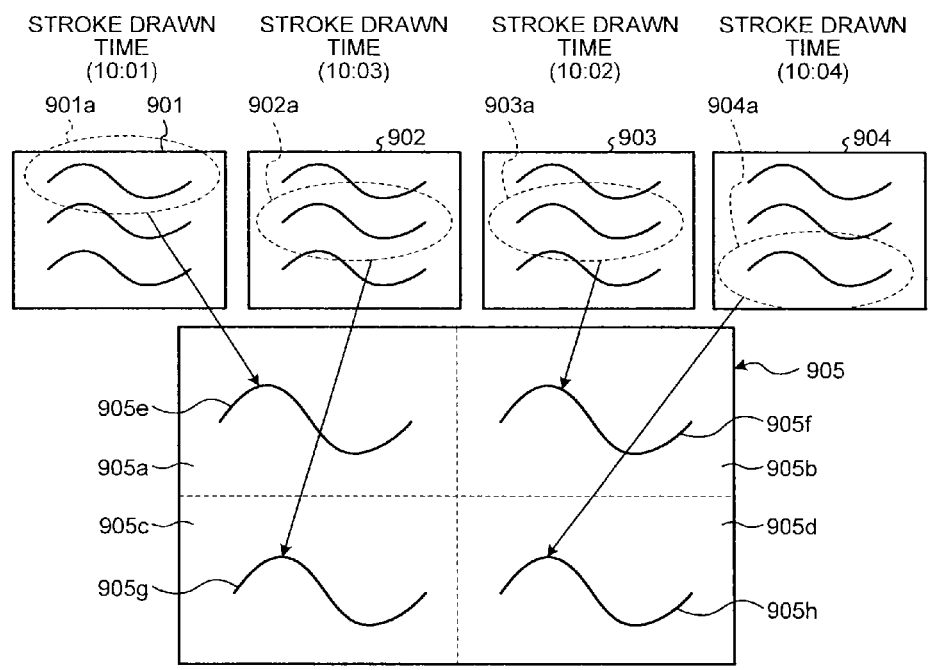
FIG. 9 is a diagram for explaining how to generate the stroke gathering page by the image processing apparatus according to the embodiment.

An example of a process for generating the stroke gathering page will be explained below with reference to FIGS. 7 to 9. FIG. 7 is a diagram illustrating an example of the stroke database before the stroke gathering page is generated by the image processing apparatus according to the embodiment. FIG. 8 is a diagram illustrating an example of the stroke database after the stroke gathering page is generated by the image processing apparatus according to the embodiment. FIG. 9 is a diagram for explaining a process for generating the stroke gathering page by the image processing apparatus according to the embodiment.

When the page generating unit 127 receives the selection notification event indicating that the page generation button is selected, and is to generate a stroke gathering page for the collection of the display images indicated by the page collection stored in the stroke database 400 as illustrated in FIG. 7, the page generating unit 127 selects, as important strokes, a plurality of strokes to which "important" is added as the attributes contained in the stroke collections stored in the stroke database 400, from among the strokes drawn in the collection of the display images indicated by the page collection stored in the stroke database 400 as illustrated in FIG. 7 (namely, a stroke identified by a stroke number 1 in the stroke collection with a page number 1 and a stroke identified by a stroke number 2 in the stroke collection with a page number 2 are selected).

Subsequently, the page generating unit 127 divides the display window generated by the application image generating unit 121 into two divided areas. The page generating unit 127 generates a stroke gathering page, in which the stroke identified by the stroke number 1 in the stroke collection with the page number 1 and the stroke identified by the stroke number 2 in the stroke collection with the page number 2 are reduced so as to fit inside the respective divided areas.

Subsequently, as illustrated in FIG. 8, the page generating unit 127 stores a page collection containing a page number 3, the page update time (10:10), and the stroke collection of the generated stroke gathering page (display image) in the stroke database 400.

For example, as illustrated in FIG. 9, when a stroke gathering page is to be generated so as to contain an important stroke 901*a* drawn in a display image 901 identified by the page number 1, an important stroke 902*a* drawn in a display image 902 identified by the page number 2, an important stroke 903*a* drawn in a display image 903 identified by the page number 3, and an important stroke 904*a* drawn in a display image 904 identified by a page number 4, the page generating unit 127 divides a display window 905 of a new page into four divided areas 905*a*, 905*b*, 905*c*, and 905*d*. Subsequently, the page generating unit 127 draws important strokes 905*e*, 905*f*, 905*g*, and 905*h*, which are obtained by reducing the important strokes 901*a*, 902*a*, 903*a*, and 904*a* so as to fit inside the divided areas 905*a*, 905*b*, 905*c*, and 905*d*, in the divided areas 905*a*, 905*b*, 905*c*, and 905*d*, respectively. In this case, the page generating unit 127 arranges the important strokes 901*a*, 902*a*, 903*a*, and 904*a* in the divided areas 905*a*, 905*b*, 905*c*, and 905*d* in order from the earliest stroke drawn time.

As described above, according to the image processing apparatus 100 of the embodiment, a plurality of important strokes are selected from among the strokes drawn in the display images displayed in a switching manner, in accordance with the attributes added to the strokes, and a stroke gathering page is generated in which the selected important strokes are arranged in accordance with the arrangement rule set in advance. Therefore, when the stroke gathering page is to be generated, it becomes not necessary to copy and paste the strokes by alternately accessing the display image and the stroke gathering page, and it becomes not necessary to re-arrange the strokes along with the flow of a discussion. Therefore, it becomes possible to assist writing so that a user can efficiently organize the discussion when using the electronic information board.

In the embodiment, when a plurality of types of attributes are added to each of the strokes drawn in the display images that are displayed in a switching manner, the page generating unit 127 may generate a stroke gathering page for each type of the attributes. Specifically, the page generating unit 127 selects, as important strokes, a plurality of strokes to which the attributes are added, for each of the attributes (for example, important, a conclusion, to-do) added by the attribute adding unit 128, from among the strokes drawn in the collection of the display images indicated by the page collection. The page generating unit 127 then generates a plurality of stroke gathering pages, in which the important strokes selected for each of the attributes are arranged.

Furthermore, in the embodiment, the page generating unit 127 generates the stroke gathering page, in which the selected important strokes are arranged in the divided areas for each of the display images in which the important strokes are drawn. However, it is not limited to this example. For example, when a plurality of important strokes are drawn in a single display image, the page generating unit 127 may generate a stroke gathering page in which the important strokes drawn in the single display image are reduced so as to fit inside respective divided areas.

Moreover, when a user comes in contact with or approaches an important stroke among the important strokes arranged in the stroke gathering page of the synthesized image displayed on the display unit 101 (the synthesized image in which the application image layer and the layer of the stroke gathering page are synthesized) to select the important stroke, the display control unit 125 causes the display unit 101 to display a display image identified by the page number (identification information) stored in association with the selected important stroke (the stroke collection) in the stroke database 400.

According to one embodiment, it is possible to assist re-arrangement of writings so that a user can efficiently organize a discussion when using the electronic information board.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
a display control circuit that controls a display to display a stroke that indicates a drawn image with respect to a display image that is displayed by the display, the drawn image generated according to a coordinate position of a detected user operation;
a memory that stores drawn strokes in association with respective display images;
an attribute adding circuit that adds an attribute to strokes displayed on the display in response to a user instruction input;
a selecting circuit that selects a plurality of strokes to which the attribute is added by the attribute adding circuit from among strokes drawn in a plurality of display images, the strokes stored in the memory; and
a generating circuit that generates a first image in which at least two strokes, to which the attribute is added and that are associated with different display images in the memory, are arranged according to an arrangement rule set in advance so as to fit inside the first image, wherein the display control circuit controls the display to display the first image in response to the user instruction input.

2. The image processing apparatus according to claim 1, wherein the generating circuit divides a display area in which the first image is displayed into a plurality of divided areas, and generates the first image such that the selected strokes are reduced to fit inside the respective divided areas.

3. The image processing apparatus according to claim 2, wherein the generating circuit divides the display area into the same number of the divided areas as the number of the display images in which the selected strokes are drawn, and generates the first image such that the selected strokes are reduced to fit inside the divided areas for each of the display images.

4. The image processing apparatus according to claim 3, wherein when the number of the display images is greater than a predetermined number, the generating circuit divides the display area into the predetermined number of the divided areas, and generates a plurality of images including the first image such that the selected strokes are reduced to fit inside the divided areas for each of the display images.

5. The image processing apparatus according to claim 4, wherein the generating circuit sets the predetermined number in accordance with a size of the display area.

6. The image processing apparatus according to claim 3, wherein when a plurality of strokes are drawn in a single display image, the generating circuit generates the first image such that the strokes drawn in the single display image are reduced to fit inside the respective divided areas.

7. The image processing apparatus according to claim 1, wherein the arrangement rule indicates that the selected strokes are arranged in order of date and time at which each of the strokes is drawn.

8. The image processing apparatus according to claim 1, wherein
the memory stores the attributes added to the strokes and addition dates and times at which the attributes are added for each of the strokes,
the selecting circuit selects strokes to which the attributes are added from among the strokes drawn in the plurality of display images, and
the arrangement rule indicates that the selected strokes are arranged in order of the addition dates and times stored in the memory.

9. The image processing apparatus according to claim 8, wherein the generating circuit generates the first image for each type of the attributes.

10. The image processing apparatus according to claim 1, wherein the arrangement rule indicates that the selected strokes are arranged in order in which the display images in which the selected strokes are drawn are displayed in a switching manner.

11. The image processing apparatus according to claim 1, wherein
the memory stores the selected strokes arranged in the first image and pieces of identification information for identifying the respective display images in which the selected strokes are drawn in an associated manner, and the display control circuit controls the display to display the display image identified by the identification information stored in association with a stroke selected from among the strokes arranged in the first image.

12. The image processing apparatus according to claim 1, wherein the generating circuit displays a button to instruct generation of the first image on the display area.

13. The image processing apparatus according to claim 1, wherein the attribute, added by the attribute adding circuit, indicates a degree of importance of the stroke, the first image generated by the generating circuit is a stroke gathering page, and the generating circuit generates the first image in response to reception of the user instruction input.

14. A non-transitory computer-readable medium storing a computer-readable program that, when executed by a computer, causes the computer to:

control a display to display a stroke that indicates a drawn image with respect to a display image that is displayed by the display, the drawn image generated according to a coordinate position of a detected user operation;

store, in a memory, drawn strokes in association with respective display images;

add an attribute to strokes displayed on the display in response to a user instruction input;

select a plurality of strokes to which the attribute is added from among strokes drawn in a plurality of display images;

generating a first image in which at least two strokes, to which the attribute is added and that are associated with different display images stored in the memory, are arranged according to an arrangement rule set in advance so as to fit inside the first image; and control the display to display the first image in response to the user instruction input.

15. An image processing system, comprising:

an information processing apparatus that transmits a plurality of display images;

a display that displays the display images transmitted by the information processing apparatus in a switching manner;

a detecting circuit that detects a contact position or an approach position of an object with respect to the display; and an image processing apparatus that draws strokes in the display images based on the contact position or the approach position, the image processing apparatus including:

a display control circuit that controls the display to display a stroke that indicates a drawn image with respect to the display images that are displayed by the display, the drawn image generated according to a coordinate position of a detected user operation;

a memory that stores drawn strokes in association with respective display images;

an attribute adding circuit that adds an attribute to strokes displayed on the display in response to a user instruction input;

a selecting circuit that selects a plurality of strokes to which the attribute is added by the attribute adding circuit from among the strokes drawn in the display images, the strokes stored in the memory; and a generating circuit that generates a first image in which at least two strokes, to which the attribute is added and that are associated with different display images in the memory, are arranged according to an arrangement rule set in advance so as to fit inside the first image, wherein the display control circuit controls the display to display the first image in response to the user instruction input.

16. An image processing method, comprising:

controlling a display to display a stroke that indicates a drawn image with respect to a display image that is displayed by the display, the drawn image generated according to a coordinate position of a detected user operation;

storing, in a memory, drawn strokes in association with respective display images;

adding, by circuitry, an attribute to strokes displayed on the display in response to a user instruction input;

selecting, by the circuitry, a plurality of strokes to which the attribute is added from among strokes drawn in a plurality of display images, the strokes stored in the memory;

generating, by the circuitry, a first image in which at least two strokes, to which the attribute is added and that are associated with different display images in the memory, are arranged according to an arrangement rule set in advance so as to fit inside the first image; and controlling the display to display the first image in response to the user instruction input.

* * * * *